United States Patent [19]
Bounds et al.

[11] Patent Number: 5,464,087
[45] Date of Patent: Nov. 7, 1995

[54] TRANSACTION SYSTEMS

[75] Inventors: David J. Bounds, Fleet; John A. Weston, Reading; Anthony D. Johnson, Workingham; Bernard J. Campbell, Sherfield-on-Loddon, all of United Kingdom

[73] Assignee: Mars, Incorporated, McLean, Va.

[21] Appl. No.: 137,099

[22] PCT Filed: Apr. 16, 1992

[86] PCT No.: PCT/GB92/00719

§ 371 Date: Nov. 15, 1993

§ 102(e) Date: Nov. 15, 1993

[87] PCT Pub. No.: WO92/20045

PCT Pub. Date: Nov. 12, 1992

[30] Foreign Application Priority Data

Apr. 24, 1991 [GB] United Kingdom ............... 9108737

[51] Int. Cl.⁶ .................................................. G06F 15/177
[52] U.S. Cl. ..................................... 194/200; 364/479
[58] Field of Search .............................. 194/200, 201, 194/217; 364/133, 479

[56] References Cited

U.S. PATENT DOCUMENTS

| | | | |
|---|---|---|---|
| 4,369,442 | 1/1983 | Werth et al. | 194/217 |
| 4,577,273 | 3/1986 | Hopper et al. | 364/200 |
| 4,704,717 | 11/1987 | King, Jr. | 370/94 |
| 4,740,910 | 4/1988 | Sakata et al. | 364/900 |

FOREIGN PATENT DOCUMENTS

| | | |
|---|---|---|
| 0366433 | 5/1990 | European Pat. Off. . |
| 58-195976 | 11/1983 | Japan .................... 364/133 |
| 2078062 | 12/1981 | United Kingdom . |
| 2209079 | 4/1989 | United Kingdom . |
| 2209080 | 4/1989 | United Kingdom . |
| WO86/03925 | 7/1986 | WIPO . |

*Primary Examiner*—F. J. Bartuska
*Attorney, Agent, or Firm*—Davis Hoxie Faithfull & Hapgood

[57] ABSTRACT

A transaction system comprises a plurality of components each performing a respective function, the components being interconnected by a serial data bus. Each component can initiate an information exchange operation with any other component. A component may transmit a message consisting of either a general instruction for causing the component receiving the message to carry out one of a plurality of different types of operations depending upon the nature of the instruction, or a message in the form of a direct memory access request identifying a specific location in a memory of the receiving component to which data is to be written or from which data is to be read.

13 Claims, 3 Drawing Sheets

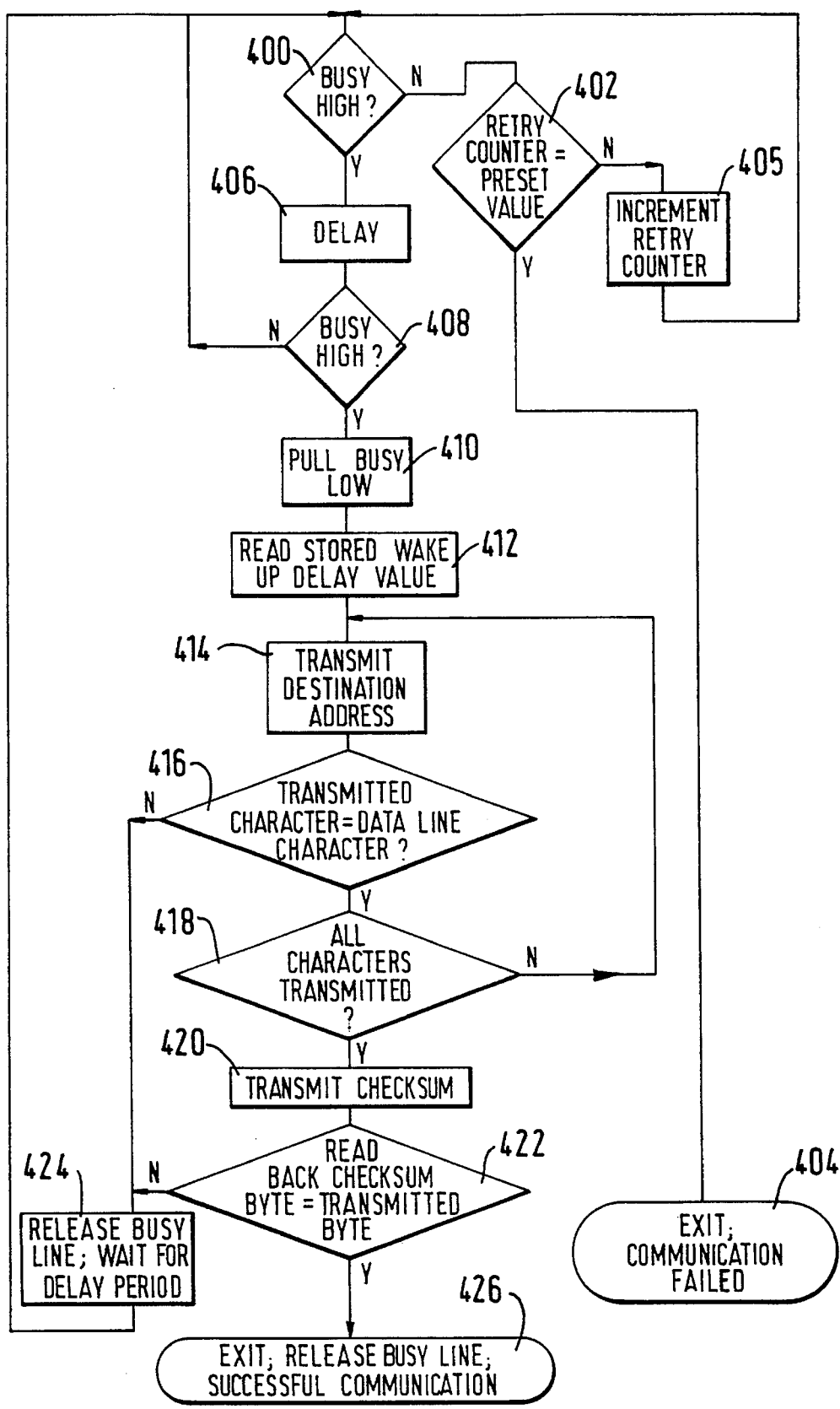

TRANSACTION SYSTEMS

FIELD OF THE INVENTION

This invention relates to transaction systems, sometimes known as payment systems. It is particularly concerned with means for interconnecting individual components of such systems.

BACKGROUND OF THE INVENTION

In the past, it has been known to provide a bus arrangement for interconnecting different components of a transaction system. For example, a vending machine may include a control circuit for controlling the dispensing of products, and a separate coin mechanism for receiving and validating inserted coins. The circuits would be interconnected by the bus so as to permit exchange of data from the coin mechanism to the control board, in order for the control board to be able to determine when sufficient coins have been received for the purchase of an article, so that the article can then be dispensed in response to the appropriate operation of one or more push-buttons of the machine. In some systems, the vending machine control circuit would initiate the information exchange by requesting the appropriate information from the coin mechanism. In other known arrangements, the coin mechanism would initiate the data transfer, and thus trigger the appropriate response from the vending machine control circuit.

Some prior art bus arrangements have been accepted as standard, and have thus provided considerable advantages in permitting independent manufacturers to produce items of equipment which can be readily connected to products of other manufacturers. However, the known bus arrangements also have a number of disadvantages. It would therefore be desirable to provide an improved bus arrangement which is more versatile and faster than known arrangements.

SUMMARY OF THE INVENTION

In accordance with one aspect of the present invention there is provided a transaction system including two or more system components interconnected by a bus, each of the components being operable to initiate communication directly with another of the components. By permitting each component to initiate communication, it is possible to avoid delays which might otherwise occur in a master/slave bus system such as the prior art systems, whereby information to be obtained from a slave component cannot be transmitted until that slave is polled by the master. Furthermore, the present invention allows direct information exchange between any two components, which was not possible in prior art arrangements unless one of the components constituted the master component. This facilitates a number of operations which would have been much more difficult to carry out in prior art systems, and which are exemplified below. Another advantage of the present invention is that it allows greater flexibility, in as much as no individual component of the system needs to have predefined functions. This differs for example from those prior art systems in which the vending machine control circuit acted as the master component, and therefore this control circuit always needed to have the additional function of controlling communications.

A still further advantage of the present invention relates to the use of shared resources, for example in a system in which two or more vending machines have a common coin mechanism. In the prior art, this was very difficult to arrange if the sharing of resources resulted in more than one master component in the system, because this would result in conflicts on the bus. This would be the case in the above example using bus arrangements of the type wherein the vending machine control circuit has control of communications and thus constitutes the master. These problems are avoided by use of the present invention, whereas with the prior art systems avoiding the problems involved considerable effort and dedicated circuits, and also exacerbated the speed problems of the bus.

In accordance with another aspect of the invention there is provided a transaction system including two or more circuit components interconnected by a bus, each circuit component having a processor and at least one peripheral device, such as a random access memory which is addressable by the processor, and each component being responsive to an instruction transmitted on the bus for selectively operating in a general instruction mode, in which the component carries out an operation of a type defined by the instruction, or in a direct access mode, in which the processor writes data to or retrieves data from a peripheral device address which is defined by the instruction received from the bus. Thus, the bus can be used for transmitting commands to individual components so as to perform specific operations, including transmitting reply data concerning transaction events, etc., and can further be used to directly access specified addresses within the component. This latter feature enables very fast reading or altering of data in the components, which is particularly useful for determining or altering configuration settings, coin validator parameters, etc., and greater flexibility in the nature of the data which can be transferred between components and the operations which can be triggered by transmitted messages.

The direct access mode will be further described below in the context of reading data from or writing data to a memory, and will be referred to as a direct memory access mode, but it will be appreciated that it can equally well be used in addition or alternatively for reading data from or writing data to an addressable input/output peripheral device.

Preferably, the random access memory of at least one of the components includes memory locations which are designated as secure locations, and the contents of which cannot be read and/or altered without a security operation being performed. The security operation may involve the transmitting over the bus of a special code which is recognised by the component having the random access memory and/or the encrypting of the data read from or to be stored in the designated locations of the random access memory.

The bus preferably has a single serial data line for communications. Preferably, the bus also has a BUSY line indicating whether or not a communication operation is taking place. Preferably the bus also includes one or more power supply lines. Preferably, the bus also includes a RESET line so that a signal on the line can be used to reset all components connected to the bus. Preferably, the bus also has a "power failure" line, and one of the components includes circuitry which detects a power failure which will imminently affect the supply voltages to other components, and in response thereto places a signal on the power failure line so that each component receiving the signal can perform an orderly shut down of operations so as to avoid the loss of data.

It is envisaged that the bus will be used to interconnect different products, possibly originating from different manufacturers. However, the bus is sufficiently versatile that it could also be used for the internal interconnection of different parts of a single product. The power failure line is particularly useful in these circumstances, wherein the product would require only a single power source and a single power failure detection circuit.

Preferably, data communication between the components takes place using a message format which contains at least one data item (such as an address) identifying the source component of the communication, and a further data item identifying the destination component. Preferably, each component is responsive to messages containing the appropriate destination code associated with that component, and each is also responsive to any message which contains a general broadcast code which is common to all the components. Preferably, each message also includes redundant data, such as a checksum, for use in error detection or error correction. Preferably, all messages also include control data. This data preferably defines the nature of the message, e.g. the control data identifies whether the message constitutes a request for a connection to another component, an acknowledgement of data received from a component, a "negative acknowledgement" indicating that a received message has not been understood, or a re-transmit message indicating that a received message was corrupted. Preferably the control data also indicates whether or not the message includes a command. The control data may distinguish between a general instruction command, and a direct memory access command. In the former case, further data defining the command would also be transmitted. In the latter case, further data identifying at least the relevant memory location to be addressed would also be transmitted. Preferably, the messages are of variable length, to enhance the efficiency of the use of the bus.

Examples of the type of component which may typically be connected to the bus include:

(a) Coin acceptor (i.e. apparatus for receiving and validating coins, and for directing the validated coin either to an accept path or a reject path).

(b) Coin selector (i.e. a combination of a coin acceptor and a separator which separates the acceptable coins into different paths depending upon denomination).

(c) Coin totaliser (i.e. a coin acceptor which additionally has transaction control functions, such as the ability to accumulate credit values, store prices of products or services, and initiate operation of a machine for vending a product or performing a service).

(d) Coin changer (i.e. an apparatus which combines the functions of coin acceptor, coin selector and coin totaliser, and further includes means for storing and dispensing coins).

(e) Coin handling system (i.e. an apparatus which combines the functions of a coin selector with the ability to store and dispense coins; in some arrangements, such as when used in payphones, the storage arrangement may take the form of a multi-denominational escrow).

(f) Coin transactor (i.e. an apparatus which combines the function of a coin changer with a vending machine control circuit).

(g) Banknote validator (i.e. an apparatus which receives and determines the acceptability of banknotes; such apparatus could be provided with additional functions corresponding to the functions listed above which can be added to coin acceptors).

(h) Card reader (i.e. a device for reading credit data or a credit identification number stored by a credit or debit card or other portable data storage device; such equipment can be provided with additional functions corresponding to those mentioned above which can be added to coin acceptors).

(i) Audit unit (i.e. a device which can collect and store transaction data from other components within the system so that this transaction data can then be delivered to a central site, e.g. by transfer to a portable data carrying unit, by data communications using telephone lines or in some other fashion).

(j) Machine controller (i.e. a device for controlling the operation of a machine for vending or performing a service, or a plurality of such machines).

(k) Terminal (i.e. a device, preferably hand-held, which is connectable to and disconnectable from the system, and which may be used for altering configuration data, or for changing parameters such as those defining the types of coins which can be accepted by a coin validator, or those defining acceptability, for example to prevent erroneous acceptance of non-genuine items).

The components may also comprise individual parts of such units. For example, a machine controller may comprise two separate components, one for handling the dispensing operations and the other for handling the user interface (i.e. keyboard and display), each part being on a respective component which is individually connected to the bus. Similarly, the coin handling system may comprise separate components, one forming a coin selector and the other forming a device which combines the functions of transaction control, coin storage and dispensing and power supply, the two components being separately connected to the bus. The unit formed by these separate components may constitute a single product. Thus, it will be appreciated that the bus can be both an external bus for interconnecting separate products, as well as an internal bus for conveying data between individual components of a single product.

BRIEF DESCRIPTION OF THE DRAWINGS

An arrangement embodying the invention will now be described by way of example with reference to the accompanying drawings, in which:

FIGS. 4A and 4B are flow charts illustrating how data on the bus is transmitted and received.

DETAILED DESCRIPTION OF THE INVENTION

Figure 1:
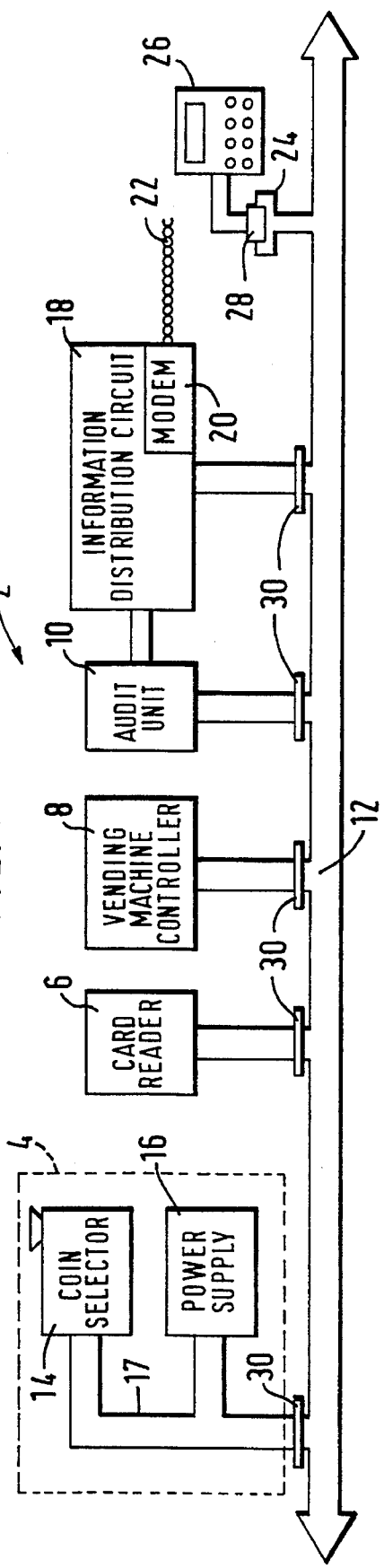
FIG. 1 is a block diagram of a transaction system in accordance with the invention.

Referring to FIG. 1, the transaction system 2 in this example comprises a coin handling system 4, a card reader 6, a vending machine controller 8 and an audit unit 10, all connected in parallel to a bus 12.

Figure 2:
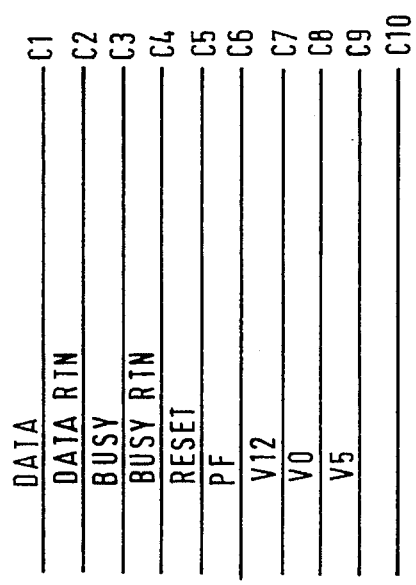
FIG. 2 illustrates the structure of the bus of the system.

The bus 12 may be as illustrated in FIG. 2, and it will be noted that this consists of ten conductors, C1 to C 10. Conductors C1 to C9 are labelled:

C1—DATA
C2—DATA RTN
C3—BUSY
C4—BUSY RTN
C5—RESET
C6—PF
C7—V12
C8—VO
C9—V5

The tenth conductor, C10 is a spare conductor for future use.

The DATA and DATA RTN lines form a pair used for serial data transmission which can be initiated by any of the units connected to the bus 12, and which can be directed to any other unit. Data is transmitted on the DATA line, and the DATA RTN line forms a return path for the current.

The BUSY line is used to indicate whether or not a communication operation is taking place. The potential on this line is normally held high, but is pulled low immediately prior to a data communication operation by the unit which is initiating the operation. The BUSY RTN line forms a return path for the current.

The RESET line can be used by a unit to cause other units connected to the bus to reset to their initial states. The PF line carries a signal derived from a power monitoring circuit which indicates an imminent supply potential failure, and is used by any unit connected to the bus to initiate an orderly shut-down of operations so that no significant data loss occurs.

The V12, VO and V5 lines are all power supply rails at respective potentials. V12 and V5 are at respectively +12 volts and +5 volts and VO is at zero volts.

Referring again to FIG. 1, the coin handling system 4 comprises a coin selector 14 and a component 16 which are disposed in a common housing. The component 16 contains a power supply unit, circuitry for controlling the coin storage and dispensing parts of the coin handling system 4, and transaction control circuitry which accumulates the value of credit generated as a result of insertion of the coins into the coin selector 14, stores product prices, and compares the accumulated credit with the stored prices and in response thereto issues signals to the vending machine controller 8 to permit the vending of products. The components 14 and 16 are individually connected to an extension 17 of the bus 12, which extends within the coin handling system 4. The extension 17 connects both components 14 and 16 to the rest of the bus 12. The bus 12 thus forms an internal connection means for the coin handling system 4 in addition to an external connection means for connecting the coin handling system 4 to the other units of the transaction system 2.

In the preferred embodiment, only the extension part 17 of the bus 12 has all ten of the conductors shown in FIG. 2. The remainder of the bus 12 consists of only four of the conductors: the DATA and BUSY lines, a power supply line (e.g. V12) and the VO line, which would be connected to the VO, DATA RTN and BUSY RTN lines of the extension 17 and perform the functions of all three of these lines.

The card reader 6 is arranged to read credit data from a portable data carrier, such as a debit card, and to write to that card updated credit data following a transaction. Accordingly, the transaction controlling component 16 needs to obtain credit data not merely from the coin selector 14 but also from the card reader 6.

As indicated above, the vending machine controller 8 is arranged to control the dispensing of products in response to signals from the transaction controlling component 16. The vending machine controller 8 also controls the operation of a display and keyboard which collectively form a user interface.

The audit unit 10 stores data relating to the operation of the transaction system, which data is received from each of the other components connected to the bus 12, and includes such information as the number and types of products dispensed, the amount of credit received and the form in which it has been received, the number of coins stored in the storage unit controlled by the component 16, etc. The audit unit 10 is operable to record not only the information received from each other component, but also the identity of the source component as defined by a source address which (as discussed below) is transmitted along the bus with the information. In this particular embodiment, the audit system is coupled to an information distribution circuit 18 which includes a modem 20 coupled to phone lines 22, and which is arranged to respond to telephone calls from a central data collection station by obtaining the necessary information from the audit system 10 and transmitting the data along the phone lines. Of course any other form of data collection can be provided, including the use of portable data carrying modules connectable to the audit unit 10.

The bus 12 is also connected to a socket 24 enabling a hand-held terminal 26 to be connected to the bus via a plug 28. The terminal 26 can be used for altering vending machine product prices, changing configuration data in any of the units, and altering the parameters used by the coin selector 14 for validating coins. It is known for coins to be validated by taking one or more measurements and determining whether the results conform to those expected of a valid coin as determined by parameters stored in a memory of the component 14. The terminal 26 could be used for altering these stored parameters. The terminal 26 could also be used for accessing the audit data from the audit unit 10.

The items 6, 8, 10, 14, 16 and 26 shown in FIG. 1 each constitute a bus-connected component capable of initiating or responding to communications on the bus 12. Each of the components has a standard connector 30 to connect it to the bus 12, except that one connector 30 is used to couple the extension 17, and thus both of the components 14 and 16, to the rest of the bus and the other components. Each component includes a microprocessor system including a memory. The memory contains an operating program for the microprocessor of the system, and data. The operating program includes an application program which is determined by the function of the component, and a communication program for handling bus communications. The communication program will be essentially the same in each of the components. At least some of the data is stored in a readable and writable random access memory which is preferably non-volatile or has a battery back-up. The data will include operational data relating to the operations which are being carried out by the component, configuration data relating to the way in which these operations are carried out (for example, price settings in a transaction control component, or calibration data in a coin acceptor), and product-specific data, for example an address allocated to the component for the purpose of data communications.

Each component is operable to communicate with one or more other components as determined by its application program in order to indicate the occurrence of certain events (e.g. coin acceptance), to request specific operations, or to report on performance (e.g. supplying information concerning the number of coins in a change tube in response to an enquiry from the audit unit 10). Such messages relating to events or performance are transmitted in the form of general instructions, and the content of such instructions identifies the nature of the data being transferred or the operation being performed or requested.

The components are also able to transmit data derived from their memories, or write data into their memories, in response to a direct memory access (DMA) request from another component. These DMA request and reply messages are distinct from the general instruction messages.

Figure 3:
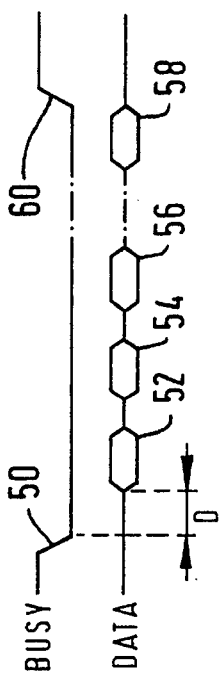
FIG. 3 is a timing diagram to illustrate how communication takes place on the bus.

With reference to FIG. 3, whenever a component wishes to transmit a message, it checks to see that the BUSY line is at a high potential. Assuming that it is, a low potential is placed on the line, as indicated at 50, and then bytes of data 52, 54, 56, 58 are transmitted in succession. After the last byte has been transmitted the BUSY line is released so that its potential returns to a high level as indicated at 60. This operation constitutes the transmission of a single message. Each message consists of at least four bytes. The first byte 52 contains the destination address, i.e. an address associated with the component to which the message is being sent. The second byte 54 contains the source address, i.e. the address of the component transmitting the message. The third byte 56 contains control data as discussed below. The last byte 58 is redundant data forming a checksum byte so that the message can be checked to determine whether or not it has been corrupted. Between the bytes 56 and 58 there may also be further bytes, depending upon the nature of the message being transmitted. The status of the BUSY line indicates to any component attempting to use the bus whether or not the data line is in use. The provision of such a line enables asynchronous communication of messages of variable length.

Referring to FIG. 4A, in order to transmit a message the circuitry in a component first checks the BUSY line at step 400. If it is determined that the BUSY line is low, then the communication program proceeds to step 402 where it is determined whether or not a timeout counter started at the beginning of the communication attempt has reached a pre-set value, or whether a permitted number of re-try attempts has been exceeded. In either of these circumstances, the program proceeds to step 404, at which point the communication program exits with a message indicating that the communication attempt has failed.

Otherwise, the program proceeds to step 405 wherein the counter for the number of re-try attempts is incremented, and then the program loops back to step 400.

Assuming that the BUSY line is found to be high, the program proceeds to step 406, which is a delay step, and then to step 408, wherein the program again checks that the BUSY line is high. If the BUSY line has gone low, the program loops back to step 400. The steps 406 and 408 ensure that the communication operation is performed by the subsequent steps only if the BUSY line has remained high for a minimum delay period, of for example one millisecond. This ensures a minimum period between successive messages, so that all components would have received the earlier message before the later message is transmitted.

After step 408, the program proceeds to step 410, at which point the BUSY line is pulled low by the circuitry of the component. Then, at step 412, the program reads a stored "wake-up delay" value from the memory of the component. This value represents a delay period D between the point 50 at which the potential on the BUSY line is brought low and the start of the transmission of the first data byte 52. Preferably, each component stores a plurality of such values in its memory, each value being associated with a respective one of the other components on the bus. The application program will provide to the communications program an identifier representing a component to which a message should be directed, and this permits the communications program to select the appropriate value from the memory. The values preferably form part of the product-specific data mentioned above, and can preferably be read and altered by other components connected to the bus, e.g. using DMA instructions. The purpose of the delay period is to ensure that the component to which the data is addressed is properly prepared to receive the message. It is known for some components of a transaction system, particularly a coin validator, to have a number of operational states, e.g. a low power state in which little current is consumed in order to conserve power, and an operational state in which coin valdation operations can occur and more current is consumed. The BUSY line can be used to switch the receiving component from a low power state to a high power state sufficient either for a full function of the component or at least for a full communication operation to take place. The wake-up delay period ensures sufficient time for this operation to occur. It will be understood that this "wake-up delay" period introduces a delay in the communication operation. However, the delay will only occur when appropriate, and if no delay period is required the relevant stored data value can be zero. This advantage would be lost using a master/slave communication system such as in the prior art, because all communications involving a slave component which needed a wake-up delay period would be delayed, even when the source of information was the slave and the delay was therefore unnecessary. Furthermore, exchanging data via the master between two slave components each requiring wake-up delay periods would substantially slow down the communication operation in the prior art systems.

After the delay period caused by step 412, the program proceeds to step 414, wherein the first character of the message, i.e. the destination address, is transmitted on the DATA line. Each component is arranged to read back from the DATA line every character it transmits, and this is checked at step 416 to determine whether it corresponds to the transmitted character. Assuming that it does correspond, the program proceeds to step 418 to check whether all the characters forming the information in the message have yet been transmitted. If not, the program loops back to steps 414 and 416. Otherwise, if all the data has been transmitted, the program proceeds to step 420 to transmit the checksum, and then to step 422 to check whether the read-back checksum byte corresponds to the transmitted byte. If so, the program exits at step 404, releasing the BUSY line and sending a message to the controlling program indicating that a successful data transfer has occurred. If it is determined at step 416 or 422 that the read-back byte differs from the transmitted byte, this is indicative of a data collision which may occur if two components simultaneously attempt to access the bus. The program then proceeds to step 424. This step causes the program to release the BUSY line and to wait for a delay period which differs for each component connected to the bus. The delay period may for example be calculated in accordance with the address of the component. Also, the counter related to the number of re-try attempts is incremented, and then the program loops back to step 400.

By using a delay period which differs for each of the components, it is ensured that two components which first simultaneously attempt to access the bus will thereafter attempt access at different times. By proper selection of the delay periods, or the addresses if these are used to calculate the delay periods, priority can be allocated to the different components so as to determine the order in Which conflicts are resolved.

Figure 4B:
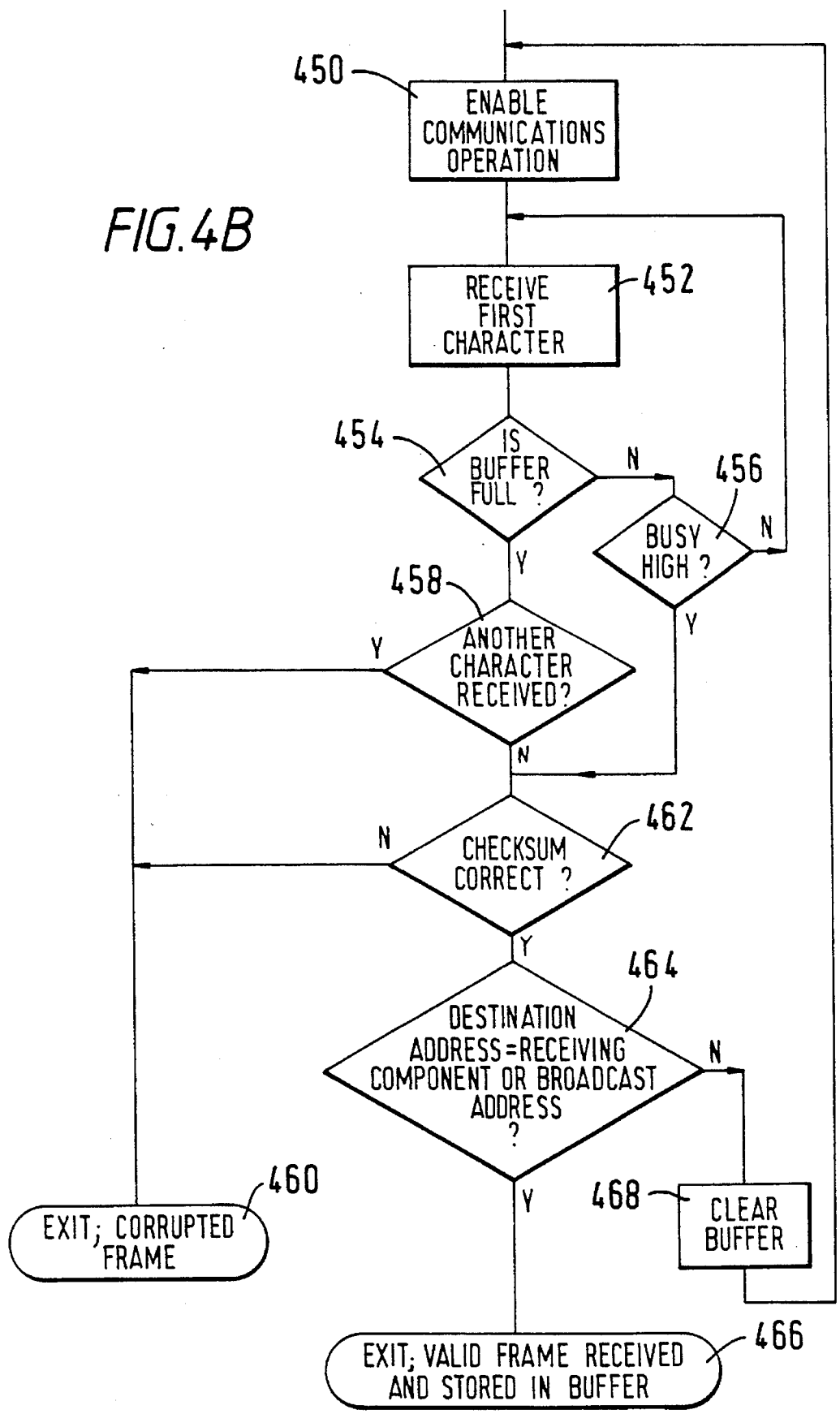

Referring to FIG. 4B, each component linked to the bus is operable in response to the BUSY line going low to receive data using the process illustrated herein. At step 450, assuming that a buffer for receiving data is empty, the communication operation is enabled. At step 452, the first character is received and then at step 454 the program checks to determine whether the buffer is full. If not, the program proceeds to step 456 to determine whether the BUSY line has returned to a high potential, and if not the program loops back to step 452 to receive the next character.

If the buffer becomes full, the program proceeds from step 454 to step 458. The program then determines whether another character is received, or whether the BUSY line regains a high potential. In the former case, this indicates a frame-over run, and the program exits at step 460 with a message indicating that a corrupted frame has been received. Otherwise, if at step 458 or 456 the program recognises that the BUSY line has returned to a high potential, the program proceeds to step 462 to determine whether the received checksum indicates that the remaining data is correct. If not, the program proceeds to step 460 to indicate a corrupted frame, but otherwise the program proceeds to step 464. Here, the program checks the destination address contained in the message. If the destination address matches that of receiving component, or if the destination address is determined to be a broadcast address which is common for all the components, the program proceeds to step 466, whereupon the communications program is exited with a message indicating that a valid frame has been received and is stored in the buffer. If it is determined at step 464 that the address is inappropriate for the receiving component, the receive buffer is cleared at step 468. The communications program thereafter enables further communications at step 450.

The control data included in each message indicates whether or not the message is one of the following four types:
(a) A connection request. This is transmitted when an instruction. e.g. information or a request for an operation to be carried out, is to be sent to another component.
(b) An acknowledgement. This acknowledges a message received from another component.
(c) A negative acknowledgement. This is sent in response to a received message which has not been understood.
(d) A re-transmit request. This is sent in response to a corrupted received message.

In the case of message types (b), (c) and (d), no other information needs to be transmitted, so that the message may consist of only four data bytes. In the case of connection request messages, the message will also include further information.

Control data in connection request messages is also operable to classify instruction messages into one of the following sub-types, which are selected by the application program:
(1) A general instruction.
(2) A reply to an instruction, which may include data requested by an instruction received by the component.
(3) A DMA read request.
(4) A reply to a DMA read request.
(5) A DMA write request.

Other sub-types may also be transmitted, for example acknowledgements from application programs (as distinct from the above-mentioned acknowledgements which are given by the communications program).

In addition to the destination, source, control data and checksum bytes, each connection request message will contain application data. For a general instruction, the application data will consists of a code identifying the type of instruction, and possibly data related thereto. For a reply message, the application data will consist of an echo of the same instruction code, together with data constituting the reply to the instruction. In the case of a DMA read request, the application data will consist of the address of the relevant memory location in the destination component, together with a checksum for this address. In the case of a reply to a DMA read request, the application data will consist of the address of the relevant memory location together with the contents of that location, and a checksum for these values. In the case of a DMA write request, the application data will consist of the address of the relevant memory location, the data to be stored therein and a checksum for these values.

In each component, the communications software is operable to receive messages as indicated above, and to pass each message to the application program when appropriate. When the control data indicates that the message relates to a general instruction, the application program then performs a selected one of a plurality of different functions dependent upon the instruction code. One of these functions may involve the sending of a reply message.

If the control data indicates that the message is a DMA read request, the application program confirms that the checksum is correct before checking that the memory address is within a range which is correct for that program. Assuming that the address is appropriate, the relevant location is accessed and the data retrieved therefrom and sent back to the source component as a message with control data indicating that this is a reply to a DMA read request. Similarly, if the component receives a DMA write request, the checksum and address range are checked, and if appropriate the data contained in the message is written to the appropriate memory location.

In the preferred embodiment, the address is also checked to determine whether or not it lies within a secure region of the memory. If so, the instruction is carried out only if the component has previously received from the source address a security code. Furthermore, any data for writing into the memory location is encrypted before being placed on the bus, and then decrypted by the receiving component. Similarly, any data sent in response to a direct memory access read request is first encrypted.

In the present embodiment, the supply voltage for the main part of the bus is derived from the transaction control component 16. This has a power supply failure detection circuit which provides a signal on the power failure line in response to detecting failure of a mains supply to the equipment, which will indicate an imminent failure of the supply voltage on the bus lines. This is used to trigger an orderly shut-down of operations in the coin acceptor 14.

It will be appreciated from the above that each of the components of the transaction system performs a separate function, and that an operational transaction system does not require the presence of any single one of these functions because each component is capable of initiating and responding to communications. This enables a much more flexible system than in the prior art, in which specific functional components containing the communication control circuitry were always required. Speed of response is also improved.

We claim:
1. A transaction system for a vending machine that dispenses a produce or service which includes two or more system components interconnected by a bus, each of the components having a processor and at least one peripheral device addressable by the processor, and each component being operable to initiate communications directly with another of the components, each component being operable to transmit a message including control data identifying the nature of the message, the control data being operable to distinguish between a first type of message forming a general instruction and a second type of message requesting direct access to a peripheral device, the receiving component being operable in response to the first type of message to perform one of a plurality of operations in dependence upon the content of that message, and being operable in response to the second type of message to write data to or retrieve data from a peripheral device of the component, and wherein each component is operable to detect a conflict between a communication operation that it initiated and a concurrent communication operation initiated by another component and is responsive thereto for reinitiating its communication after a delay period which differs for each component.

2. A system as claimed in claim 1, wherein each component has a respective one or more of the following functions:

(a) determination of coin validity, (b) control of means for dispensing a product or performing a service, (c) control of storage and dispensing of coins, (d) storage of price data, accumulation of credit data and comparison of price and credit data, (e) reading of data from portable data carrying means, (f) acquisition and storage of information concerning operation of the system, (g) determination of banknote validity, (h) alteration of configuration data in other components.

3. A system as claimed in claim 1, wherein the bus has a first part forming an internal interconnection between a multi-component product, and a second part for interconnecting that product with other components.

4. A system as claimed in claim 1, wherein the bus has a power fail conductor for carrying a signal indicative of an imminent supply voltage failure, whereby each component receiving the signal can ensure that operations can be halted without loss of significant data.

5. A system as claimed in claim 3, wherein the bus has a power fail conductor for carrying a signal indicative of an imminent supply voltage failure, whereby each component receiving the signal can ensure that operations can be halted without loss of significant data, and wherein only the first part of the bus has the power fail conductor.

6. A transaction system for a vending machine that dispenses a product or service which includes two or more system components interconnected by a bus, each of the components being operable to initiate communications directly with another of the components and each component being operable to transmit a message on the bus in a format which includes data identifying the transmitting component and further data identifying another component which is to receive the message, and wherein each component is operable to detect a conflict between a communication operation that it initiated and a concurrent communication operation initiated by another component and is responsive thereto for reinitiating its communication after a delay period which differs for each component.

7. A transaction system for a vending machine that dispenses a product or service which includes two or more system components interconnected by a bus comprising a data conductor for carrying serial data and a usage conductor for carrying a signal indicating whether or not the data conductor is in use, each of the components being operable to initiate communications directly with another of the components by altering the potential on the usage line, and then transmitting data on the data line, the component being operable to vary the period between the altering of the potential on the usage line and the transmission of data in dependence upon the intended destination of the message.

8. A system as claimed in claim 7, wherein the component transmitting the message stores data values each indicative of a required delay period for each of the other components connected to the bus.

9. A system as claimed in claim 8 wherein said delay period data values are alterable in response to messages transmitted on the bus.

10. A transaction system for a vending machine that dispenses a product or service which includes two or more system components interconnected by a bus, each of the components having a processor and at least one peripheral device addressable by the processor and being operable to initiate communications directly with another of the components, and each component being operable to detect a conflict between a communication operation which it has initiated and a concurrent communication operation initiated by another component, each transmitting component being responsive thereto for re-initiating the communication operation after a delay period which differs for each component connected to the bus.

11. A system as claimed in claim 10, wherein the delay period for each component is determined by the address of that component.

12. A system as claimed in claim 10, wherein each component is operable to detect a conflict by reading back data which it has placed on the bus and checking the received data with the transmitted data.

13. The transaction system of claim 10, wherein each component is responsive to an instruction transmitted on the bus for selectively operating in a general instruction mode, in which the component carries out an operation of a type defined by the instruction, or in a direct access mode, in which data is retrieved from or written to an address of the component's peripheral device defined by the instruction received from the bus.

* * * * *